(12) United States Patent
Xiang et al.

(10) Patent No.: US 12,340,603 B2
(45) Date of Patent: Jun. 24, 2025

(54) METHOD AND APPARATUS FOR MARKING OBJECT OUTLINE IN TARGET IMAGE, AND STORAGE MEDIUM AND ELECTRONIC APPARATUS

(71) Applicant: SANECHIPS TECHNOLOGY CO., LTD., Shenzhen (CN)

(72) Inventors: Yan Xiang, Shenzhen (CN); Xiao Zhang, Shenzhen (CN); Ke Xu, Shenzhen (CN); Fang Zhu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 435 days.

(21) Appl. No.: 18/000,737

(22) PCT Filed: May 24, 2021

(86) PCT No.: PCT/CN2021/095562
§ 371 (c)(1),
(2) Date: Dec. 5, 2022

(87) PCT Pub. No.: WO2021/258955
PCT Pub. Date: Dec. 30, 2021

(65) Prior Publication Data
US 2023/0106178 A1  Apr. 6, 2023

(30) Foreign Application Priority Data
Jun. 24, 2020 (CN) .................. 202010591353.9

(51) Int. Cl.
*G06V 20/70* (2022.01)
*G06N 3/045* (2023.01)
(Continued)

(52) U.S. Cl.
CPC ............. *G06V 20/70* (2022.01); *G06N 3/045* (2023.01); *G06N 3/0475* (2023.01); *G06V 10/82* (2022.01)

(58) Field of Classification Search
CPC ........ G06V 20/70; G06V 10/82; G06V 10/44; G06V 10/7747; G06V 10/778;
(Continued)

(56) References Cited

U.S. PATENT DOCUMENTS 9,560,271 B2 * 1/2017 Na ........................ H04N 23/80
10,049,308 B1 8/2018 Dhua et al.
(Continued)

FOREIGN PATENT DOCUMENTS

CN       109741395 A     5/2019
CN       109886970 A     6/2019
(Continued)

OTHER PUBLICATIONS

Fong, R., et al. "Interpretable Explanations of Black Boxes by Meaningful Perturbation," 2017 IEEE International Conference on Computer Vision (ICCV), 2017, pp. 3449-3457.
(Continued)

*Primary Examiner* — Wassim Mahrouka
(74) *Attorney, Agent, or Firm* — Vivacqua Crane, PLLC

(57) ABSTRACT

Disclosed are a method and apparatus for labeling an object contour in a target image, a non-transitory computer-readable storage medium and an electronic device. The method for labeling an object contour in a target image includes acquiring a target image feature of a target image, inputting the target image feature into a target generator, and acquiring a target mask of the target image generated by the target generator, wherein the target mask is used for labeling a contour of the target object.

11 Claims, 6 Drawing Sheets

(51) Int. Cl.
*G06N 3/0475* (2023.01)
*G06V 10/82* (2022.01)
(58) Field of Classification Search
CPC .... G06N 3/045; G06N 3/0475; G06N 3/0464;
G06N 3/047; G06N 3/094; G06T
2207/20081; G06T 2207/20084; G06T
7/12; G06T 7/13
See application file for complete search history.

(56) References Cited

U.S. PATENT DOCUMENTS

| | | | | |
|---|---|---|---|---|
| 2016/0148362 | A1* | 5/2016 | Bedi | G06T 5/77 |
| | | | | 382/180 |
| 2019/0130278 | A1 | 5/2019 | Karras et al. | |
| 2022/0121958 | A1 | 4/2022 | Karras et al. | |

FOREIGN PATENT DOCUMENTS

| | | | |
|---|---|---|---|
| CN | 109903291 | A | 6/2019 |
| CN | 110188835 | A | 8/2019 |
| CN | 110298850 | A | 10/2019 |
| CN | 110675353 | A | 1/2020 |
| CN | 111259772 | A | 6/2020 |
| CN | 111325726 | A | 6/2020 |
| DE | 102018126670 | A1 | 5/2019 |
| EP | 4145819 | A1 * | 3/2023 ............. G06T 5/005 |

OTHER PUBLICATIONS

The State Intellectual Property Office of People's Republic of China. First Office Action and Search Report for CN Application No. 202010591353.9 and English translation, mailed Mar. 29, 2025, pp. 1-12.
Zhang, X., et al. "Visual Feature Attribution Based on Adversarial Feature Pairs," Journal of Computer Research and Development, vol. 57, No. 3, 2020, pp. 604-615.
European Patent Office. Extended European Search Report for EP Application No. 21829598.8, mailed Jun. 11, 2024, pp. 1-9.
Singh, V. et al. "Breast tumor segmentation and shape classification in mammograms using generative adversarial and convolutional neural network," Expert Systems with Applications, 2020, pp. 1-14.
International Searching Authority. International Search Report and Written Opinion for PCT Application No. PCT/CN2021/095562 and English translation, mailed Aug. 9, 2021, pp. 1-11.

* cited by examiner

METHOD AND APPARATUS FOR MARKING OBJECT OUTLINE IN TARGET IMAGE, AND STORAGE MEDIUM AND ELECTRONIC APPARATUS

CROSS-REFERENCE TO RELATED APPLICATION

This application is a national stage filing under 35 U.S.C. § 371 of international application number PCT/CN2021/095562 filed May 24, 2021, which claims priority to Chinese patent application No. 202010591353.9, filed Jun. 24, 2020. The contents of these applications are incorporated herein by reference in their entirety.

TECHNICAL FIELD

Embodiments of the present disclosure relate to the field of computers, and in particular to a method and apparatus for labeling an object contour in a target image, a non-transitory computer-readable storage medium and an electronic device.

BACKGROUND

In the existing technology, in some cases it is usually necessary to label and segment the target object in an image. For example, the contour of a character in an image needs to be labeled. However, in some cases, the contour of the character can be labeled by weakly supervised learning methods.

However, existing weakly supervised learning methods usually adopt image-level classification tags. If the above methods are adopted, the accuracy of labeling and segmenting objects by the trained model is low.

In other words, in some cases in the existing technology, in the process of segmenting and predicting the target object in the image to determine the contour of the target object by weakly supervised learning, a problem of low accuracy of contour determination is encountered.

SUMMARY

Embodiments of the present disclosure provide a method and apparatus for labeling an object contour in a target image, a non-transitory storage medium and an electronic device in order to solve at least to a certain extent the problem of low accuracy in determining a contour of a target object by weakly supervised learning in some cases in the existing technology.

According to an embodiment of the present disclosure, a method for labeling an object contour in a target image is provided. The method may include acquiring a target image feature of a target image, where the target image includes a target object, and the target object is of a target type. The method may further include inputting the target image feature into a target generator, where the target generator is a generator in a generative adversarial network trained by utilizing a sample image, the generative adversarial network includes the target generator and a discriminator, the target generator is configured to generate a first mask of the sample image upon acquiring a first image feature of the sample image, and the discriminator is configured to, upon receiving a sample image obtained after erasing pixels corresponding to the first mask, identify the type of a sample object in the sample image obtained after erasing the pixels, the type of the sample object is used for training parameters in the target generator. The method may further include acquiring a target mask of the target image generated by the target generator, where the target mask being used for labeling a contour of the target object.

According to another embodiment of the present disclosure, an apparatus for labeling an object contour in a target image is provided. The apparatus may include a first acquisition unit, a first input unit and a second acquisition unit. The first acquisition unit is configured to acquire a target image feature of a target image, where the target image includes a target object, the target object is of a target type. The first input unit is configured to input the target image feature into a target generator. The target generator is a generator in a generative adversarial network trained by using a sample image. The generative adversarial network includes the target generator and a discriminator. The target generator is configured to generate a first mask of the sample image upon acquiring a first image feature of the sample image. The discriminator is configured to, upon receiving a sample image obtained after erasing pixels corresponding to the first mask, identify the type of a sample object in the sample image obtained after erasing the pixels. The type of the sample object is used for training parameters in the target generator. The second acquisition unit is configured to acquire a target mask of the target image generated by the target generator. The target mask is used for labeling a contour of the target object.

According to yet another embodiment of the present disclosure, further provided is a non-transitory computer-readable storage medium having stored thereon computer programs which, when executed by a processor, cause the processor to carry out any one of the above methods.

According to yet another embodiment of the present disclosure, an electronic apparatus is further provided. The electronic apparatus may include a memory and a processor, where the memory stores computer programs which, when executed by a processor, cause the processor to carry out any one of the above methods.

DETAILED DESCRIPTION

The embodiments of the present disclosure will be described in detail below by embodiments with reference to the accompanying drawings.

It is to be noted that the terms "first" and "second" in the description and claims of the present disclosure and the accompanying drawings are used to distinguish similar objects, and are not necessarily used to describe a specific order or precedence.

Figure 1:
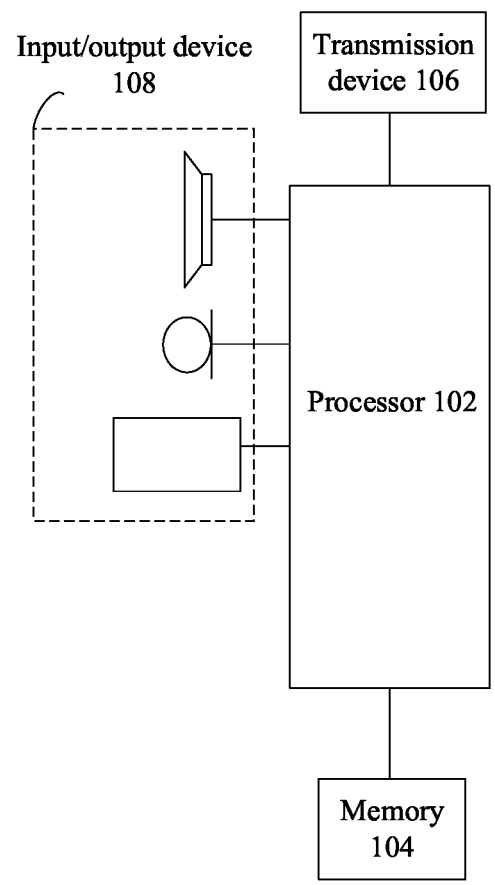
FIG. 1 is a schematic diagram of an application scenario of a method for labeling an object contour in a target image according to an embodiment of the present disclosure.

The method embodiments provided in the embodiments of the present disclosure may be executed in mobile terminals, computer terminals or similar arithmetic apparatuses. By taking execution of the method in a mobile terminal as an example, FIG. 1 is a hardware structure diagram of a mobile terminal for a method for labeling an object contour in a target image according to an embodiment of the present disclosure. As shown in FIG. 1, the mobile terminal may include one or more (only one is shown in FIG. 1) processors 102 (the processor 102 may include, but not limited to, a microprocessor unit (MCU), a programmable logic device (FPGA) or other processing apparatuses) and a memory 104 configured to store data. The mobile terminal may further include a transmission device 106 for communication functions and an input/output device 108. It should be understood by a person having ordinary skills in the art that the structure shown in FIG. 1 is merely illustrative and not intended to limit the structure of the mobile terminal. For example, the mobile terminal may further include more or less components than those shown in FIG. 1, or have a configuration different from that shown in FIG. 1.

The memory 104 may be configured to store computer programs, for example, software programs and modules of applications, such as computer programs corresponding to the method for labeling an object contour in a target image in the embodiments of the present disclosure. The processor 102 executes various functional applications and data processing, i.e., implementing the method described above, by running the computer programs stored in the memory 104. The memory 104 may include high-speed random-access memories, or may include non-volatile memories, such as one or more magnetic storage devices, flash memories or other non-volatile solid-state memories. In some instances, the memory 104 may further include memories remotely arranged relative to the processor 102. These remote memories may be connected to the mobile terminal via a network. Examples of the network include, but not limited to, Internet, Intranet, local area networks, mobile communication networks and combinations thereof.

The transmission device 106 is configured to receive or transmit data via a network. Instances of the network may include wireless networks provided by a communication provider of the mobile terminal. In one instance, the transmission device 106 includes a Network Interface Controller (NIC), which can be connected to other network devices through a base station to communicate with the Internet. In one instance, the transmission device 106 may be a Radio Frequency (RF) module which is configured to communicate with the Internet in a wireless manner.

Figure 2:
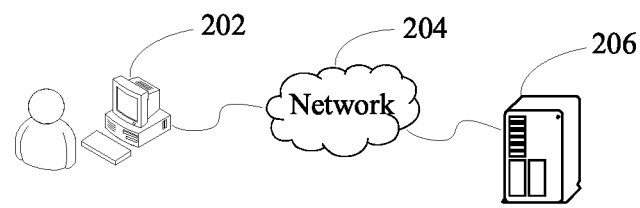
FIG. 2 is a schematic diagram of another application scenario of the method for labeling an object contour in a target image according to an embodiment of the present disclosure.

The embodiments of the present disclosure can be run on the network architecture shown in FIG. 2. As shown in FIG. 2, the network architecture includes: a terminal 202, a network 204 and a server 206. Data interaction can be performed between the terminal 202 and the server 20 through the network 204.

Figure 3:
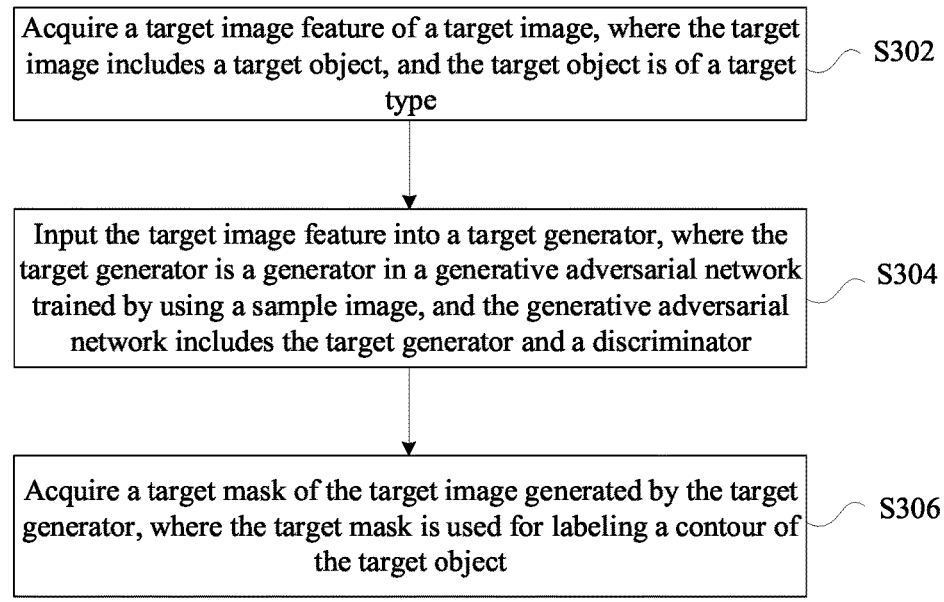
FIG. 3 is a flowchart of the method for labeling an object contour in a target image according to an embodiment of the present disclosure.

The embodiment provides a method for labeling an object contour in a target image that is executed in the mobile terminal or the network architecture. FIG. 3 is a flowchart of the method for labeling an object contour in a target image according to the embodiment of the present disclosure. As shown in FIG. 3, the flow may include steps S302 to S306.

At S302, a target image feature of a target image is acquired, where the target image includes a target object, and the target object is of a target type.

At S304, the target image feature is input into a target generator, where the target generator is a generator in a generative adversarial network trained by utilizing a sample image. The generative adversarial network includes the target generator and a discriminator. The target generator is configured to generate a first mask of the sample image upon acquiring a first image feature of the sample image. The discriminator is configured to, upon receiving a sample image obtained after erasing pixels corresponding to the first mask, identify the type of a sample object in the sample image obtained after erasing the pixels. The type of the sample object is used for training parameters in the target generator.

At S306, a target mask of the target image generated by the target generator is acquired, where the target mask is used for labeling a contour of the target object.

By the above steps, since the target generator is used to generate the first mask of the sample image and erase the pixels corresponding to the first mask in the process of training the target generator, the image can be identified as a whole in the process of training the discriminator, thereby facilitating the target generator to generate a more accurate mask, improving the accuracy of the target generator and improving the accuracy of labeling the contour of the target object in the target image by the target generator. Therefore, the problem of low identification efficiency of the object contour can be solved, and the effect of improving the identification efficiency of the object contour can be achieved.

The execution body of the above steps may be, but not limited to, a base station, a terminal, a server, and the like.

The objective of the target generator is to generate a better segmentation mask of an input image, so that the discriminator cannot determine the type of the target object in the image obtained after erasing the mask. The objective of the discriminator is to identify the target type of the target object in the image as completely as possible. In other words, for an image that contains an object, the target generator is to generate a good enough first mask and erase the pixels in the image corresponding to the first mask, so that the discriminator cannot determine the type of the object in the image. The discriminator is to determine the type of the object in the image by utilizing the content of the object that is not erased in the image.

The embodiments of the present disclosure may be applied to, but not limited to, the process of identifying a contour of an object in an image. For example, for an input image that contains a target object labeled with a target type, in the embodiments of the present disclosure, a target mask can be generated by the trained generator by inputting the image into the generator. The contour of the target object in the image is labeled in the target mask, so that the image is semantically segmented.

For example, for an image that contains a cat and is labeled with a cat tag, after the image is input into the target generator, a target mask is generated by the target generator, and the contour of the cat is labeled in the target mask.

Prior to inputting the target image feature into the target generator, the method further includes: acquiring the sample image; acquiring a first image feature of the sample image; acquiring a first image feature of the sample image; inputting the first image feature into the generative adversarial network, and generating the first mask of the sample image by the target generator; erasing pixels corresponding to the image mask to obtain a first image; inputting the first image and the sample image into the discriminator to train the discriminator; and, inputting the first image into the target generator to train the target generator.

In other words, in the embodiments of the present disclosure, the target generator and the discriminator are pre-trained networks. The sample image is used during pre-training. The sample image includes a first object labeled with a type. After the sample image is input into the target generator, the target generator will generate a mask of the sample image, and a target position in the image is labeled in the mask. Then, the pixels at the target position are erased to obtain a first image, and the first image and the sample image are input into the discriminator to train the discriminator. After the discriminator is trained, the discriminator can output the type of the first object in the first image. A target generator with a better output mask can be obtained by training the target generator using the type and the first image.

Alternatively, in the embodiments of the present disclosure, it is also possible that, a plurality of sample images are acquired, and a part of the plurality of sample images are input into the target generator to generate first masks by the target generator. Then, pixels corresponding to the first masks of this part of sample images are erased; and, this part of sample images obtained after erasing the pixels and the remaining sampling samples that are not input into the target generator are input into the discriminator to train the discriminator.

The inputting the first image and the sample image into the discriminator to train the discriminator includes: calculating a first loss of the discriminator after inputting the first image and the sample image into the discriminator; and, adjusting parameters in the discriminator by utilizing the first loss. In an embodiment, the parameters in the discriminator can be adjusted in a case where the first loss is greater than a first threshold. The first loss of the discriminator after the parameters are adjusted is less than or equal to the first threshold.

During this process, the first loss of the discriminator needs to be calculated. The larger the first loss is, the worse the convergence effect of the model is. Therefore, it is necessary to adjust the values of parameters in the model. The values of the parameters are continuously adjusted and the loss is continuously calculated until the first loss is less than or equal to the first threshold, indicating that the parameters of the model are appropriate and the model is enough convergent.

The inputting the first image into the target generator to train the target generator includes: acquiring a first type of a first object in the first image output after inputting the first image into the discriminator; calculating a second loss of the target generator under the first type; and, adjusting parameters in the target generator by utilizing the second loss. In an embodiment, the parameters in the target generator can be adjusted in a case where the second loss is greater than a second threshold. The second loss of the target generator after the parameters are adjusted is less than or equal to the second threshold.

The loss also needs to be calculated in the process of training the target generator. After the discriminator outputs the type of the first image, the second loss of the target generator under this type is calculated. The larger the second loss is, the worse the convergence effect of the model is. Therefore, it is necessary to adjust the values of parameters in the model. The values of the parameters are continuously and the loss is continuously calculated until the second loss is less than or equal to the second threshold, indicating that the parameters of the model are appropriate and the model is enough convergent.

The acquiring a target image feature of a target image includes: acquiring the target image; inputting the target image into a target model, the target model being a model obtained after deleting a fully-connected layer of a pre-trained first model; and, acquiring the target image feature of the target image output by the target model.

That is, the target image feature of the target image is obtained through a target model. The target model is a pre-trained model. By adopting the target model, after the target image is input, the target model can obtain the target image feature of the target image.

Prior to inputting the target image into the target model, the method further includes: acquiring the sample image; training a second model by utilizing the sample image to obtain the trained first model; and, deleting a fully-connected layer of the first model to obtain the target model.

That is, in the embodiments of the present disclosure, the target model is a model obtained by training the second model using the sample image to obtain the first model and then deleting the fully-connected layer of the first model.

The method for labeling an object contour in a target image will be described below by way of an example.

The ideal of the embodiments of the present disclosure is as follows. When a neural network is trained for image classification, the trained network often does not concern all the feature at the position of the whole target. As a result, the pixels of the features concerned by the network in the input image are deleted by erasing during the training process. In order to better identify the target in the image, the neural network has to concern the features of other parts at the position of the target in the image. By continuously iterating in the above way, the neural network will finally concern all the features at the position of the whole target. The position distribution is consistent with the distribution of the semantic segmentation mask of the object, so that the target segmentation mask in the image is finally obtained by a classification tag. The above idea is achieved in an adversarial training manner in the embodiments of the present disclosure. The target generator is configured to generate the first mask of the target in the sample image, and the discriminator is configured to determine the type of the sample picture obtained after the pixels corresponding to the first mask are erased. During the training process, the target generator will confront the discriminator to generate a better first mask to decrease the number of pixels of the target in the image and weaken the discriminator's perception to the target in the image. The discriminator will gradually concern all the feature at the position of the target in the image in order to better identify the object in the image. Finally, after the Nash equilibrium is reached, the target generator generates a good enough mask, so that the discriminator cannot determine the type of the image obtained after the mask is erased. The Nash equilibrium is a combination of best strategies, meaning that the parameters in both the target generator and the discriminator are the best. Specifically, it means that the target generator generates a first mask that just blocks the object in the image. After the pixels corresponding to the first mask are erased, the object in the image is just erased. Since the object has been erased, the discriminator cannot determine the type of the object. However, if the first mask does not completely block the object, the discriminator can determine the type of the object by identifying a part of the object that is not blocked.

Figure 4:
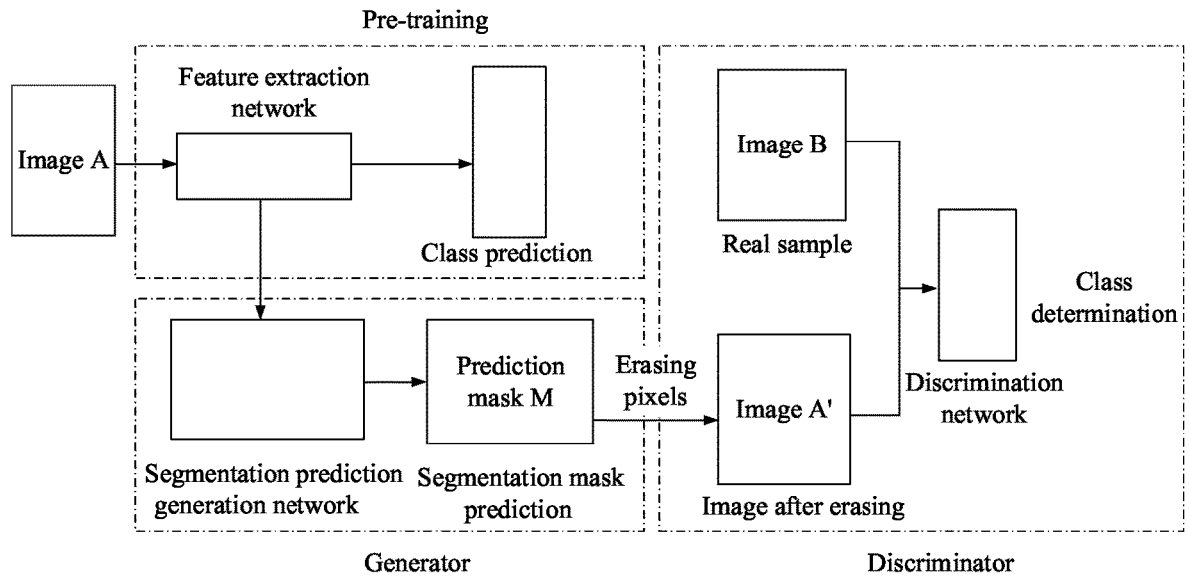
FIG. 4 is a schematic structural diagram of a model of the method for labeling an object contour in a target image according to an embodiment of the present disclosure.

As shown in FIG. 4, the network structure in the embodiments of the present disclosure can be mainly divided into three parts, i.e., a pre-trained feature extraction network, a semantic segmentation generation network (target generator) and a discrimination network (discriminator).

The pre-trained feature extraction network may adopt a conventional image classification network (a second model) (e.g., Inception, ResNet, and the like, but not limited thereto), and is pre-trained on a data set. After the network is trained to convergence (after the first model is obtained), the last fully-connected layer of the network is deleted to obtain the target model. A convolution feature output by the target model serves as the input of the target generator. During the training of the second model, the convolution in the pre-trained feature extraction network will be replaced with dilated convolutions with different dilation parameters. Since the dilated convolution has a larger respective field than the general convolution, the second network model can have a more comprehensive perception of the target in the image, so that the perception range of the trained target network more tends to be closer to the semantic segmentation mask of the target, facilitating the subsequent semantic segmentation generation network to converge faster, and ensuring the stability of adversarial training.

The semantic segmentation generation network, also known as a segmentation prediction generation network (target generator), uses the convolution feature of the pre-trained feature extraction network as an input. The network gradually increases the width and height of a feature map by a deconvolution layer until the size is consistent with the size of the image input into the pre-trained network. Finally, semantic segmentation prediction is performed on the target in the image.

The discrimination network also adopts a conventional image classification network (e.g., Inception, ResNet, and the like, but not limited thereto) to determine the target in the image (including background type). The input of the discrimination network mainly includes two parts (as shown in FIG. 4): the image obtained after erasing the pixels corresponding to the prediction mask, and a real image B. Similarly, in order to improve the identification accuracy of the discrimination network, the discrimination network also adopts dilated convolutions with different dilation coefficients to better perceive the target in the image more comprehensively.

The training process is mainly divided into two steps. Firstly, the feature extraction network is pre-trained on a data set. After the network is trained to convergence, the fully-connected layer of the network is deleted, and a last convolution activation feature of the network is used as the input of the segmentation prediction network. Then, adversarial training is performed on the segmentation prediction generation network and the discrimination network. As shown in FIG. 4, after an image A passes through the feature extraction network and the segmentation prediction generation network, a mask M of a target in the image A is predicted, and pixels corresponding to the mask M in the image A are erased to obtain an image A'. Firstly, the discriminator is trained using A' and the real image B by minimizing a classification loss; and then, the target generator is trained using A' by minimizing a non-current classification loss. The convergence is finally realized by repetitive iteration.

Figure 5:
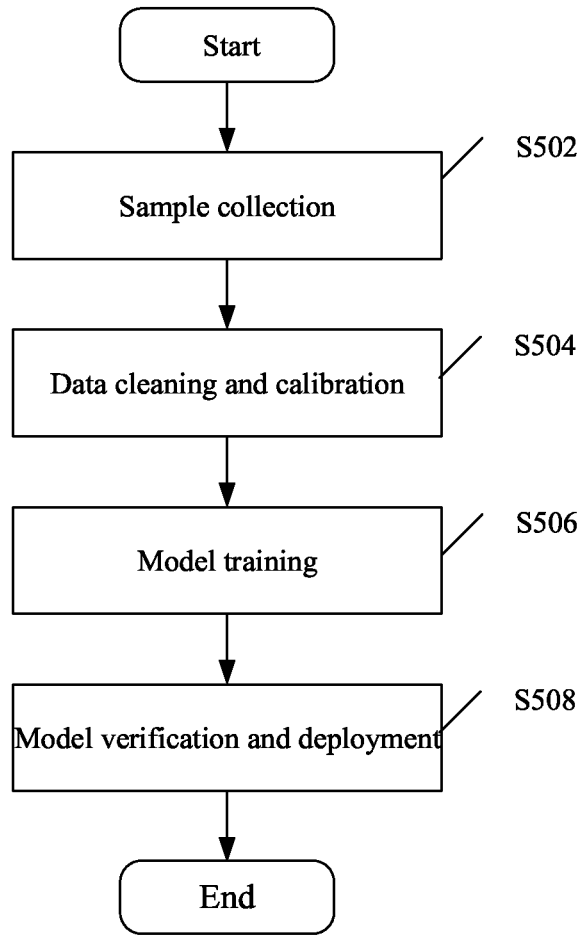
FIG. 5 is a flowchart of another method for labeling an object contour in a target image according to an embodiment of the present disclosure.

As shown in FIG. 5, at S502, the sample image needs to be acquired before training. During the sample collection process, in order to achieve the better segmentation effect in training, it is necessary to collect as many sample images as possible in the application scenario. The image may also be acquired in the following ways: utilizing images in various public indoor scenarios containing characters; acquiring pictures in an actual application scenario; purchasing from a third-party data company; generating by an image generation algorithm (e.g. GAN); acquiring by a network crawler based on an academic purpose; or the like.

At S504, after the data is acquired, the data needs to be cleaned and calibrated. In order to better train the network, it is necessary to verify and check the acquired data to ensure the completeness, uniformity, correctness or the like of samples. The completeness means that the data set should contain all possible scenarios among application scenarios to ensure the generalization ability of the trained model. For example, the motion blur in the sample image caused by too fast motion of the target should also be contained in the data set. The uniformity means that different types of samples in the data set should be consistent in quantity as far as possible and should not differ greatly. The correctness means that data labeling should have a clear labeling standard to avoid confusion of labeling.

After the sample data is acquired, S506 may be executed to train the model. Firstly, the second model is trained to obtain a first model so as to obtain a target model.

Classification training is performed on the pre-trained feature extraction network (the second model) on the data set. During training, the loss is calculated by a cross entropy through the following calculation formula:

$$\text{loss}(z, c) = -\log\left(\frac{\exp(z[c])}{\sum_{j=0}^{C-1}\exp(z[j])}\right) \quad (1)$$

where z is a non-SoftMax output predicted by the network, and c is the type of the label.

After the model is trained to convergence, the first model is obtained, and the fully-connected layer for final classification in the first model is deleted to obtain a target model. The output of the target model is used as the input of the subsequent segmentation prediction network. If the amount of data is insufficient, the input data can be enhanced to improve the performance of the network.

Next, the target generator and the discriminator need to be trained. After the pre-trained feature extraction network is trained, adversarial training is performed on the segmentation prediction generation network and the discrimination network. At this time, the pre-trained feature extraction network and the segmentation prediction network are trained as a whole. However, compared with the segmentation prediction network, the pre-trained feature extraction network will have a smaller learning rate.

(1) For each data set batch, the discriminator is firstly trained, and real data and the image obtained after erasing pixels corresponding to the mask are input into the discriminator. After the data and the image pass through a softmax function, the loss is calculated by a cross entropy.

(2) The target generator is then trained. The image obtained after erasing pixels predicted by the mask is input into the discriminator and then passes through a softmin function. For the type of the image obtained after erasing pixels predicted by the mask output by the discriminator, the loss is calculated by a cross entropy.

(3) The steps (1) and (2) are repeated until the model converges.

The above process completes the training of the model.

Figure 6:
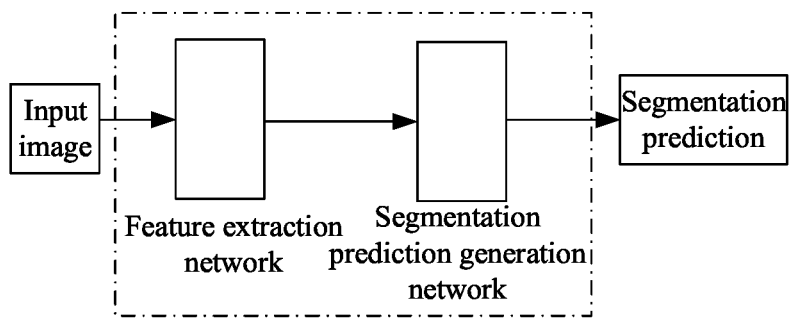
FIG. 6 is a schematic structural diagram of a model combination of a method for labeling an object contour in a target image according to an embodiment of the present disclosure.

Subsequently, at S508, the deployment and verification of the model may be performed. After training, if it is necessary to deploy the network, as shown in FIG. 6, the feature extraction network (target network) and the segmentation prediction generation network (target generator) can be combined to obtain a complete segmentation prediction network. The corresponding result of semantic segmentation prediction can be obtained only by inputting the original image data. The network can be applied to most semantic segmentation application scenarios. For example, for an image that contains an object, the result of semantic segmentation prediction may include the contour of the object in the image, so that the object in the image can be labeled.

In order to verify the actual effect of the model, the mask output by the network will be compared with the manually labeled actual mask. The prediction quality of the mask can be evaluated by Mean Interaction of Union (MIoU), which is defined as follows:

$$MIoU = \frac{1}{N+1} \Sigma_{i=0}^{N} \frac{p_{ii}}{\Sigma_{j=0}^{N} p_{ij} + \Sigma_{j=0}^{0} p_{ji} - p_{ii}} \quad (2)$$

where N+1 denotes the number of classes (including null class); N is an integer; $p_{ij}$ denotes pixels in the image that are actually of class i but predicted as class j; $p_{ii}$ denotes pixels that are actually of class i and predicted as class i; and i and j are integers.

In the method provided in the embodiment of the present disclosure, the generative adversarial network is trained by erasing pixels corresponding to the mask. Compared with supervised semantic segmentation training methods, in the embodiment of the present disclosure, only classification tags are used, so that the workload for neural network labeling is greatly reduced, and the labor cost is reduced. Meanwhile, compared with other semi-supervised semantic segmentation methods based on the class activation map, in the embodiment of the present disclosure, excessive artificial prior experience is not required, and no additional parameters need to be added, so that in a case where the amount of training data is the same, the trained network has higher robustness and better network universality, and the result of identification of the contour of the object in the image is more accurate.

From the foregoing description of the implementations, it should be clearly understood by those having ordinary skills in the art that the method according to the above embodiments may be implemented by software and necessary general-purpose hardware platforms. Of course, the method may also be implemented by hardware. However, in many cases, the former is preferred. Based on this understanding, the technical schemes of the present disclosure may be essentially embodied in form of software products, or some of the technical schemes that contribute to the prior art may be embodied in form of software products. The computer software products are stored in a storage medium (e.g., ROM/RAM, magnetic disks or optional disks), and include a number of instructions which, when executed by a terminal device (which may be a mobile terminal, a computer, a server, a network device, and the like), cause the terminal device to carry out the method according to the embodiments of the present disclosure.

In the embodiment, an apparatus for labeling an object contour in a target image is further provided. The apparatus is configured to implement the above embodiments and some implementations, and the description that has been given will not be repeated here. As used hereinafter, the term "module" may be a combination of software and/or hardware that implements predetermined functions. Although the apparatus described in the following embodiments is preferably implemented by software, it is possible and contemplated to implement the apparatus by hardware or a combination of software and hardware.

Figure 7:
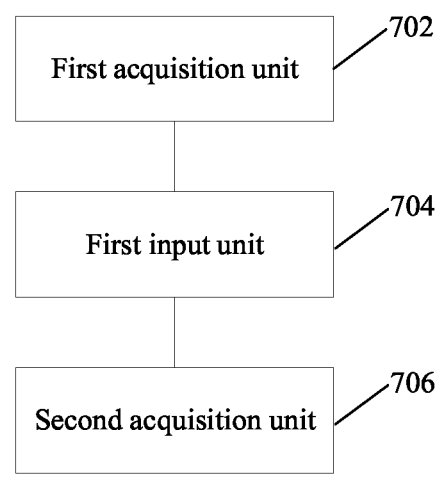
FIG. 7 is a block diagram of an apparatus for labeling an object contour in a target image according to an embodiment of the present disclosure.

FIG. 7 is a block diagram of an apparatus for labeling an object contour in a target image according to an embodiment of the present disclosure. As shown in FIG. 7, the apparatus may include a first acquisition unit 702, a first input unit 704 and a second acquisition unit 706.

The first acquisition unit 702 is configured to acquire a target image feature of a target image. The target image includes a target object, the target object being of a target type.

The first input unit 704 is configured to input the target image feature into a target generator. The target generator is a generator in a generative adversarial network trained by utilizing a sample image. The generative adversarial network includes the target generator and a discriminator. The target generator is configured to generate a first mask of the sample image upon acquiring a first image feature of the sample image. The discriminator is configured to, upon receiving a sample image obtained after pixels corresponding to the first mask are erased, identify the type of a sample object in the sample image obtained after the pixels are erased. The type is used for training parameters in the target generator.

The second acquisition unit 706 is configured to acquire a target mask of the target image generated by the target generator. The target mask is used for labeling a contour of the target object.

Figure 8:
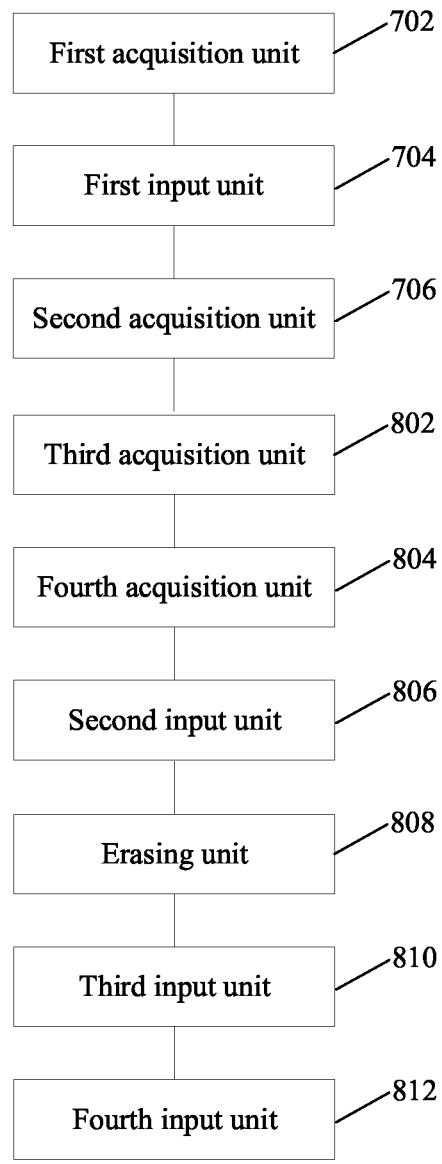
FIG. 8 is a block diagram of another apparatus for labeling an object contour in a target image according to an embodiment of the present disclosure.

FIG. 8 is a block diagram of an apparatus for labeling an object contour in a target image according to an embodiment of the present disclosure. As shown in FIG. 7, in addition to all modules shown in FIG. 7, the apparatus may further include a third acquisition unit 802, a fourth acquisition unit 804, a second input unit 806, an erasing unit 808, a third input unit 810 and a fourth input unit 812.

The third acquisition unit 802 is configured to acquire the sample image before the target image feature is input into the target generator.

The fourth acquisition unit 804 is configured to acquire a first image feature of the sample image.

The second input unit 806 is configured to input the first image feature into the generative adversarial network and generate the first mask of the sample image by the target generator.

The erasing unit 808 is configured to erase pixels corresponding to the first mask to obtain a first image.

The third input unit 810 is configured to input the first image and the sample image into the discriminator to train the discriminator.

The fourth input unit 812 is configured to input the first image into the target generator to train the target generator.

The third input unit includes a first calculation module and a first adjustment module. The first calculation module is configured to calculate a first loss of the discriminator after the first image and the sample image are input into the discriminator. The first adjustment module is configured to adjust parameters in the discriminator in a case where the first loss is greater than a first threshold. The first loss of the discriminator after the parameters are adjusted is less than or equal to the first threshold.

The fourth input unit includes a first acquisition module, a second calculation module and a second adjustment module. The first acquisition module is configured to acquire a first type of a first object in the first image output after the first image is input into the discriminator. The second calculation module is configured to calculate a second loss of the target generator under the first type. The second adjustment module is configured to adjustment parameters in the target generator in a case where the second loss is greater than a second threshold, where the second loss of the target generator after the parameters are adjusted is less than or equal to the second threshold.

The fourth acquisition unit includes a second acquisition module, an input module and a third acquisition module. The second acquisition module is configured to acquire the target image. The input module is configured to input the target image into the target model, the target model being a model obtained after deleting a fully-connected layer of a pre-trained first model. The third acquisition module is configured to acquire the target image feature of the target image output by the target model.

The fourth acquisition unit further includes a fourth acquisition module, a training module and a deletion module. The fourth acquisition module is configured to acquire the sample image before the target image feature is input into the target model. The training module is configured to train a second model by utilizing the sample image to obtain the trained first model. The deletion module is configured to delete the fully-connected layer of the first model to obtain the target model.

It is to be noted that the above modules may be implemented by software or hardware. In the latter case, the modules may be implemented in the following way, but not limited to: the modules are located in a same processor; or, the modules are located in different processors in any combination.

According to an embodiment of the present disclosure, further provided is a non-transitory computer-readable storage medium having computer programs stored thereon which, when executed by a processor, cause the processor to carry out any one of the methods.

In an exemplary embodiment, the non-transitory computer-readable storage medium may include, but not limited to: U disks, read-only memories (ROMs), random access memories (RAMs), mobile hard disks, magnetic disks, optical disks, or various mediums that can store computer programs.

Figure 9:
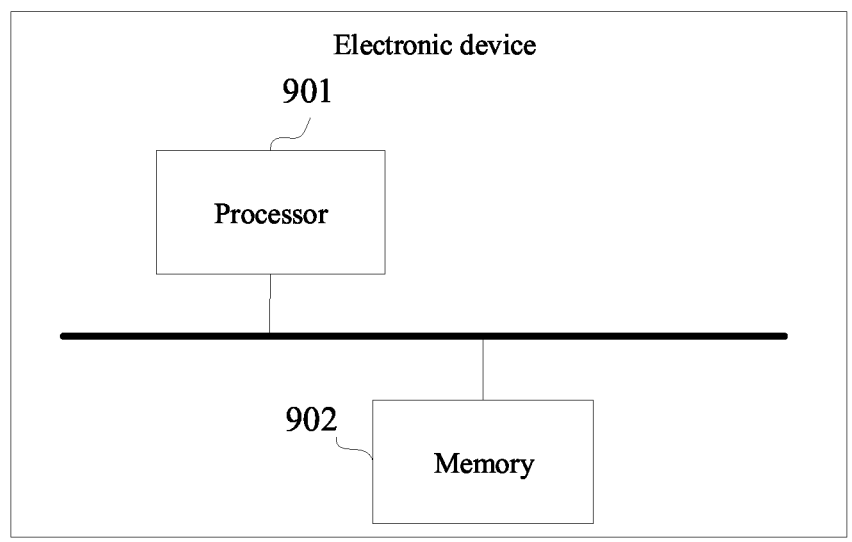
FIG. 9 is another electronic device for labeling an object contour in a target image according to an embodiment of the present disclosure.

With reference to FIG. 9, according to an embodiment of the present disclosure, further provided is an electronic device. The electronic device may include a memory 902 and a processor 901. The memory 902 stores computer programs which, when executed by the processor 901, cause the processor to carry out any one of the methods.

In an exemplary embodiment, the electronic device may further include a transmission device and an input/output device. The transmission device is connected to the processor 901, and the input/output device is connected to the processor 901.

In accordance with the present disclosure, since the target generator is used to generate the first mask of the sample image and erase the pixels corresponding to the first mask in the process of training the target generator, the image can be identified as a whole in the process of training the discriminator, thereby facilitating the target generator to generate a more accurate mask, improving the accuracy of the target generator and improving the accuracy of labeling the contour of the target object in the target image by the target generator. Therefore, the problem of low identification efficiency of the object contour can be solved, and the effect of improving the identification efficiency of the object contour can be achieved.

The specific examples in the embodiment may refer to the examples described in the above embodiments and exemplary implementations, and will not be repeated in the embodiment.

Apparently, it should be understood by those having ordinary skills in the art that, the modules or steps in the present disclosure may be implemented by a general computing device, and may be integrated in a single computing device or distributed on a network consisting of a plurality of computing devices. The modules or steps may be implemented by program codes that may be executed by a computing device, so that they may be stored in a storage device and executed by the computing device. In addition, in some cases, the shown or described steps may be executed in an order different from the order described herein. Or, the modules or steps are manufactured into integrated circuit modules, or some of the modules or steps are manufactured into single integrated circuit modules. Therefore, the present disclosure is not limited to any particular combination of hardware and software.

The foregoing description merely shows some embodiments of the present disclosure and is not intended to limit the present disclosure. Various alterations and variations may be made to the present disclosure by those having ordinary skills in the art. Any modifications, equivalent replacements and improvements made without departing from the principle of the present disclosure shall fall into the protection scope of the present disclosure.

What is claimed is:

1. A method for labeling an object contour in a target image, comprising:
   acquiring a target image feature of a target image, wherein the target image comprises a target object of a target type;
   inputting the target image feature into a target generator, wherein the target generator is a generator in a generative adversarial network trained by utilizing a sample image, the generative adversarial network comprises the target generator and a discriminator, the target generator is configured to generate a first mask of the sample image upon acquiring a first image feature of the sample image, and the discriminator is configured to, upon receiving a sample image obtained after pixels corresponding to the first mask are erased, identify the type of a sample object in the sample image obtained after the pixels are erased, the type of the sample object is used for training parameters in the target generator; and
   acquiring a target mask of the target image generated by the target generator, wherein the target mask is used for labeling a contour of the target object.

2. The method of claim 1, prior to the inputting the target image feature into the target generator, further comprising:
acquiring a first image feature of the sample image;
inputting the first image feature into the target generator to generate the first mask of the sample image;
erasing pixels corresponding to the first mask to obtain a first image;
inputting the first image and the sample image into the discriminator to train the discriminator; and
inputting the first image into the target generator to train the target generator.

3. The method of claim 2, wherein the inputting the first image and the sample image into the discriminator to train the discriminator comprises:
calculating a first loss of the discriminator after the first image and the sample image are input into the discriminator; and
adjusting parameters in the discriminator by utilizing the first loss.

4. The method of claim 2, wherein the inputting the first image into the target generator to train the target generator comprises:
acquiring a first type of a first object in the first image output after the first image is input into the discriminator;
calculating a second loss of the target generator under the first type; and
adjusting parameters in the target generator by utilizing the second loss.

5. The method of claim 2, wherein the acquiring a target image feature of a target image comprises:
acquiring the target image;
inputting the target image into a target model, the target model being a model obtained after deleting a fully-connected layer of a pre-trained first model; and
acquiring the target image feature of the target image output by the target model.

6. The method of claim 5, prior to the inputting the target image feature into the target generator, further comprising:
acquiring the sample image;
training a second model by utilizing the sample image to obtain the trained first model, the second model being the first model before training; and
deleting a fully-connected layer of the first model to obtain the target model.

7. The method of claim 5, wherein convolution layers of the discriminator and the first model comprise dilated convolutions with different dilation coefficients.

8. An apparatus for labeling an object contour in a target image, comprising:
a first acquisition unit, configured to acquire a target image feature of a target image, wherein the target image comprises a target object of a target type;
a first input unit, configured to input the target image feature into a target generator, wherein the target generator is a generator in a generative adversarial network trained by utilizing a sample image, the generative adversarial network comprises the target generator and a discriminator, the target generator is configured to generate a first mask of the sample image upon acquiring a first image feature of the sample image, and the discriminator being configured to, upon receiving a sample image obtained after pixels corresponding to the first mask are erased, identify the type of a sample object in the sample image obtained after the pixels are erased, the type of the sample object is used for training parameters in the target generator; and
a second acquisition unit, configured to acquire a target mask of the target image generated by the target generator, wherein the target mask is used for labeling a contour of the target object.

9. A non-transitory computer-readable storage medium having computer programs stored thereon which, when executed by a processor, cause the processor to carry out the method of claim 1.

10. An electronic device, comprising a memory and a processor, the memory storing computer programs which, when executed by a processor, cause the processor to carry out a method for labeling an object contour in a target image, the method comprising:
acquiring a target image feature of a target image, wherein the target image comprises a target object of a target type;
inputting the target image feature into a target generator, wherein the target generator is a generator in a generative adversarial network trained by utilizing a sample image, the generative adversarial network comprises the target generator and a discriminator, the target generator is configured to generate a first mask of the sample image upon acquiring a first image feature of the sample image, and the discriminator is configured to, upon receiving a sample image obtained after pixels corresponding to the first mask are erased, identify the type of a sample object in the sample image obtained after the pixels are erased, the type of the sample object is used for training parameters in the target generator; and
acquiring a target mask of the target image generated by the target generator, wherein the target mask is used for labeling a contour of the target object.

11. The method of claim 6, wherein convolution layers of the discriminator and the first model comprise dilated convolutions with different dilation coefficients.

* * * * *